United States Patent [19]

Lynn et al.

[11] Patent Number: 5,147,459
[45] Date of Patent: Sep. 15, 1992

[54] CEMENTITIOUS PRODUCTS

[75] Inventors: Michael E. Lynn, Tonbridge; Christine A. Durey, Bexley, both of England

[73] Assignee: Marley Tile AG, Zurich, Switzerland

[21] Appl. No.: 571,626

[22] PCT Filed: Mar. 7, 1989

[86] PCT No.: PCT/GB89/00229
§ 371 Date: Sep. 5, 1990
§ 102(e) Date: Sep. 5, 1990

[87] PCT Pub. No.: WO89/08627
PCT Pub. Date: Sep. 21, 1989

[30] Foreign Application Priority Data

Mar. 8, 1988 [GB] United Kingdom ............. 8805481

[51] Int. Cl.$^5$ ............................................. C04B 12/04
[52] U.S. Cl. ...................... 106/601; 106/600; 106/602; 106/603; 106/624; 106/631
[58] Field of Search ............... 106/601, 602, 603, 624, 106/600, 631

[56] References Cited

U.S. PATENT DOCUMENTS

| | | | |
|---|---|---|---|
| 3,663,290 | 5/1972 | Klinge | 117/3 |
| 3,804,058 | 4/1974 | Messenger | 106/606 |
| 4,402,749 | 9/1983 | Hall et al. | 106/606 |
| 4,410,365 | 10/1983 | Glukhovsky et al. | 106/606 |
| 4,410,366 | 10/1983 | Birchall et al. | 106/696 |
| 4,461,644 | 7/1984 | Childs et al. | 106/606 |
| 4,462,835 | 7/1984 | Car | 106/602 |
| 4,600,514 | 7/1986 | Conner | 106/606 |
| 4,642,137 | 2/1987 | Heitzmann et al. | 106/607 |
| 4,664,712 | 5/1987 | Cisneros | 106/602 |
| 4,780,142 | 10/1988 | Rechter | 106/600 |

FOREIGN PATENT DOCUMENTS 253450 1/1988 European Pat. Off. .
2168692 6/1986 United Kingdom .

OTHER PUBLICATIONS

Young, J. F., *Macro-Defect-Free Cement: A Review*, Mat. Res. Soc. Symp. Proc., vol. 179, pp. 101-121 (1991).

*Primary Examiner*—William R. Dixon, Jr.
*Assistant Examiner*—Anthony J. Green
*Attorney, Agent, or Firm*—Bacon & Thomas

[57] ABSTRACT

Macro defect free cementitious products are obtained by curing or firing a cementitious composition comprising water, a reactive filler and a water soluble alkali metal silicate.

The products show good strength and heat and water stability, by contrast with known mdf products where leaching out of the polymers used results in decreased strength.

18 Claims, No Drawings

CEMENTITIOUS PRODUCTS

This invention relates to cementitious products and more particularly to a method of making shaped and hardened cementitous products by curing or firing compositions comprising reactive fillers and silicates. The term 'cementitious products' is used herein to refer to products made from cementitious compositions, i.e. compositions which are mouldable or otherwise shapable and which can be hardened, for example by curing or firing.

The development of high strength cementitious products has been the focus of much research activity. Methods which have been proposed for making such products include the addition of fibrous and/or organic polymeric materials to uncured cementitious compositions and the treatment of conventional cementitious compositions to reduce the pore volume so as to give so-called macro-defect free cementitious products (see EP-A-0021682). A combination of these techniques has been described in EP-A-0055035; however the macro-defect free (mdf) cementitious products described in this latter specification suffer from the problem that the polymer contained therein has a tendency to leach out of the cured cement on contact with water with consequent reduction of the strength of the product. In addition the cured products in general have poor heat stability even at temperatures as low as 80° C.

Various attempts have been made to solve the problems of poor water-stability and poor thermal stability which have been encountered with mdf cementitious products. These have included treatment with boric acid (GB-A-2168292), burning out of the polymer followed by contact with water (GB-A-2168293) and careful control of the nature of the calcium silicate (GB-A-2162165). In addition it has been proposed to cross-link the polymers to hinder leaching out of the polymer (GB-A-2181726). None of these methods has however been entirely satisfactory.

We have now surprisingly found that compositions comprising one or more reactive fillers (e.g. pozzolanic materials) and one or more alkali metal silicates can be used to make high strength mdf cementitious products having both good water- and thermal stability. It has not hitherto been appreciated that the abovementioned compositions could be satisfactorily subjected to the high shear mixing processes required to make mdf products and that they could subsequently be successfully shaped and hardened, e.g. by forming into cohesive sheets and curing or firing, to obtain mdf cementitious products having advantageous properties.

According to one feature of the invention, therefore, there is provided a mdf cementitious product made by curing or firing of a cementitious composition comprising water, at least one reactive filler (e.g. a pozzolanic material) and at least one water soluble alkali metal silicate, not more than 4% of the total volume of the product being made up of pores of maximum dimension exceeding 100 microns. Preferably these pores do not form more than 2%, more preferably not more than 0.5%, of the total volume of the product. The strength of the product is greater the smaller the proportion of relatively large pores and thus it is preferred that not more than 2% of the total volume is made up of pores of maximum dimension exceeding 50 microns, more preferably 15 microns. It is also preferred that the total pore volume of the product does not exceed 20% of the total volume including pores, more preferably not exceeding 10% of the total volume.

According to a further feature of the invention, there is provided a process for the preparation of a cementitious product according to the invention as hereinbefore defined which comprises milling a cementitious composition as hereinbefore defined, by means of high shear mixing, shaping the milled composition thereby obtained and then hardening the compositon by curing or firing.

The term "reactive filler" as used herein is intended to include filler materials capable of reacting chemically with an alkali metal silicate to form a cementitious composition or product.

Suitable reactive fillers are for example pozzolanic materials, the term pozzolanic being well known and defining a class of generally siliceous or aluminosiliceous materials which are not themselves cementitious but which react with slaked lime to yield a cementitious composition or product. Preferred examples of these materials suitable for use in the invention include pulverised fuel ash (PFA) and blast furnace slag. One particularly preferred reactive filler is a ground, granulated blast furnace slag sold under the trade name CEMSAVE by Civil & Marine Ltd., of West Thurrock, Grays, Essex, England. Other possible reactive fillers include underburnt clays and shales; burnt gaize; rice husk; bauxite waste (a by-product of aluminium production); natural pozzolans such as volcanic ashes; and silica fume. Silica fume is a known material, comprising extremely fine spherical silica particles; when fused to form highly branched chain structures thixotropic silica fumes are obtained, while in non-thixotropic fumes there is no significant tendency to form branched chains.

The reactive fillers for use in the invention preferably contain calcium as one of the cations present, for improved water stability. In view of its lower calcium content, silica fume is advantageously used in combination with one or more calcium-containing reactive fillers.

The reactive filler suitably consists of particles of less than 200 microns diameter, preferably less than 100 microns.

The water-soluble alkali metal silicate used in the invention may for example be a potassium or lithium or other silicate but sodium silicates are preferred. Aqueous solutions of such silicates are highly basic and the nature of the silicate anions is variable—they may, for example, exist as oligomeric polysilicates although shorter chains are also possible, including dimeric, trimeric and tetrameric silicates. One suitable material is sold under the Trade Mark KLEENODENSE 145K by Akzo Chemie, Amersfoort, Netherlands, and is a viscous liquid of about pH 12 containing oligomeric sodium and potassium silicates. This material is sold for use in the production of Polysil concretes, these concretes consisting generally of KLEENODENSE, fly ash and aggregate, but despite its ready availability the possibility of using KLEENODENSE in the production of mdf cementitious products has not hitherto been appreciated. Other suitable materials are Crosfield Crystal Sodium Silicate 100N, Crystal 112, Crystal 120A and Crystal 125, available from Crosfield Chemicals Ltd, Warrington, England. In general the water-soluble alkali metal silicates for use in the invention are less expensive than organic polymers which have previously been used in the production of high strength cementitious products.

It has been found that the higher viscosity silicates give particularly good results in terms of strength of the resulting product. It is therefore preferred that the alkali metal silicate has a viscosity of at least 500 centipoise, more preferably at least 1000 centipoise and still more preferably at least 2000 centipoise.

The precursor compositions used in the production of the mdf cementitious products according to the invention may optionally contain additional ingredients. For example, small quantities of hydraulic cement, for instance Portland cement or high-alumina cement, are preferably included where it is desired to accelerate the setting reaction and improve the handling of the mix. Flow improving agents such as glycerol may also preferably be included while it may also be desirable to include a thickening agent where the alkali metal silicate is of lower viscosity. Other possible additives are for example unreactive fillers or aggregates such as fine silica sand, calcium carbonate and talc.

Incorporation of fibres into the precursor compositions can give better milling properties and also better strength and impact resistance in the final product. Suitable fibres include nylon (polyamide), polypropylene, polyester and polyacrylonitrile fibres.

The proportions of the various ingredients are selected to provide a precursor composition which can be satisfactorily mixed with high shear and subsequently shaped and hardened. In general the mix will preferably contain 30 to 90%, more preferably 50 to 85% and still more preferably 60 to 80%, by weight of reactive filler and 1 to 30% by weight, more preferably 3 to 15% and still more preferably 5 to 12% by weight, of alkali metal silicate (dry weight). As regards optional ingredients, the precursor compositions will preferably contain up to 20%, more preferably 2 to 20% and still more preferably 5 to 10%, by weight of hydraulic cement, and up to 5%, more preferably 0.2 to 2%, of glycerol. As regards the water content of the precursor compositions, the percentage of water in the mix is preferably 1 to 30%, more preferably 3 to 20% and still more preferably 5 to 15%, by weight. All the abovementioned percentages are based on the total weight of the mix.

The precursor compositions are subjected to high shear mixing, preferably as hitherto described for use in the production of mdf cementitious products (see for example EP-A-0021682). This mixing may be in a bladed high shear mixer or a screw extruder but is most preferably achieved by calendering in a twin roll mill by passing the composition repeatedly through the nip between the rolls of the mill with the rolls being rotated at different speeds, for instance in a ratio of about 4:5 or about 10:11.

It will be appreciated that the consistency of the mix is important in determining the milling properties and that the amount of water and other ingredients should be selected to provide a millable composition. The flow behaviour of the millable precursor compositions is desirably such that they readily flow under minimum force as described in EP-A-55035 and in Phil. Trans. R. Soc. Lond. A310, pages 139-153 (1983), i.e. they possess the so-called "Bingham" type flow behaviour. Such flow behaviour results in good milling properties and high strength in the resulting cured or fired product. The rolls are preferably set to provide a calendered sheet having a thickness of not more than 20 mm, e.g. of about 1 or 2 to 20 mm, and the calendering is repeated until a substantially homogeneous calendered sheet is obtained.

Following thorough mixing the compositions are shaped and then hardened by curing or firing to provide the mdf cementitious products according to the invention. The shaping step conveniently comprises pressing, again as hitherto described for the production of mdf cementitious products, for instance at a pressure in the range 0.5 to 5 MPa, preferably 2 to 4 MPa. It may then be convenient to subject the shaped product to an initial setting step to provide shape stability prior to curing or firing. Setting can be carried out at ambient or elevated temperatures, e.g. at a temperature of from 10° C. to 100° C. for a period of 5 minutes to 24 hours. Where shaping is effected by pressing the setting step can be carried out with the pressure still applied. Following setting, the shaped product can if desired be moved, e.g. to a curing oven. Curing is preferably effected at temperatures within the range of from 10° to 120° C., more preferably 60° to 100° C., for periods of from 6 hours to 7 days or more, for example overnight. Curing is advantageously effected under humid conditions, for instance with the products enclosed in plastic bags or other containers to avoid shrinkage due to water loss. Much faster curing can if desired be achieved by the use of microwave radiation whereby curing can for example be completed within less than one hour. As an alternative to curing, the compositions may be fired e.g. at temperatures of from 600° to 1200° C., preferably 800° to 1000° C., for periods of from 15 minutes to 2 hours, preferably 30 minutes to 1.5 hours.

The above described processes for preparation of mdf cementitious products constitute further features of the present invention.

The production of mdf cementitious products of high flexural strength, with for example MOR values in excess of 15 MPa, makes possible the use of this novel material for a wide range of applications, for example roof tiles and roofing slates of high flexural strength. Other possible uses for the mdf cementitious products according to the invention are as materials for domestic and industrial flooring tiles, wall tiles, panelling for walls, ceilings, floors and roofing, corrugated sheeting, e.g. for fencing and roofing, and extruded piping.

The invention is illustrated by the following Examples. Pulverised fuel ash was obtained under the trade name Pozzolan from Pozzolanic-Lytag Ltd., Hemel Hempstead, Herts, England; Kleenodense 145K from Akzo Chemie, Amersfoort, Netherlands; ciment fondu was obtained from Lafarge Aluminous Cement Co. Ltd., Grays, Essex, England. Crosfield Crystal Silicates were obtained from Crosfield Chemicals Ltd, Warrington, England; Omya BLR3 chalk was obtained from Croxton & Garry Ltd, of Dorking, Surrey, England; Elkem Micro Silica from Elkem Chemicals Limited of High Wycombe, Bucks., England.

EXAMPLE 1

A mix was prepared containing 74.5% by weight of pulverised fuel ash (Pozzolan), 21% by weight of Kleenodense 145K (containing 46.8% solids, 53.2% water), 4% ciment fondu (high alumina cement) and 0.5% glycerol. Mixing took place in a Hobart planetary mixer for 1 to 2 minutes; the mix was then transferred to a twin roll mill with roll speeds in the ratio of 4:5 and mixed by passing approximately five times between the rolls to form a homogeneous sheet of thickness approximately 3 mm. The calendered material was then transferred to a press with a flat mould for pressing at 3 MPa for 10 minutes at ambient temperature.

Following pressing the sheet was subjected to further setting in an oven at 80° C. for 30 minutes and then demoulded and cured at 80° C. overnight in a sealed bag.

Test pieces (80×40×3 mm) were prepared from the cured sheet.

The three-point modulus of rupture values were determined using the following formula:

$$M.O.R. = \frac{3 \cdot W \cdot L}{2 \cdot d^2 \cdot b}$$

where
M.O.R. = Modulus of Rupture (MPa)
W = Breaking load (N)
L = Span between supports (mm)
d = Thickness (mm)
b = Width (mm)
The following result was obtained:

Dry strength = 12.4 MPa.

EXAMPLE 2

A formulation was prepared, milled and cured to set the material for ease of handling as in Example 1.

Once cured the sheet was fired at 1000° C. for 1 hour, after which it was cooled to room temperature.

Test pieces (80×40×3 mm) were prepared from the fired sheet.

The three-point modulus of rupture value was determined as 25.8 MPa (dry).

EXAMPLE 3-6

Macro defect free materials were prepared to the formulations described in TABLE 1. Mixing and material processing were as described in Example 1.

Test pieces (80×40×3 mm) were prepared from the cured sheet.

The three-point modulus of rupture values were determined and are also shown in TABLE 1.

TABLE 1

| | Example | | | |
|---|---|---|---|---|
| | 3 % | 4 % | 5 % | 6 % |
| POZZOLAN (Pulverised Fuel Ash) | 69.2 | 65.3 | 65.3 | 65.3 |
| ORDINARY PORTLAND CEMENT | 8.7 | 8.5 | 8.5 | 8.5 |
| KLEENODENSE 145K | 22.1 | — | — | — |
| CRYSTAL 112 | — | 26.2 | — | — |
| CRYSTAL 120A | — | — | 26.2 | — |
| CRYSTAL 125 | — | — | — | 26.2 |
| MODULUS OF RUPTURE (Dry [MPa]) | 12.0 | 13.1 | 14.2 | 20.3 |
| MODULUS OF RUPTURE (Wet [MPa]) | 6.9 | 15.5 | 10.9 | 14.4 |
| PRESSING AND CURING DETAILS | 3 MPa, RT*, 20-30 min.; 14 days at 50° C. enclosed in a plastic bag | 3 MPa, RT, 30 min.; 24 hrs. at 50° C. enclosed in a plastic bag | 3 MPa, RT, 30 min.; 264 hrs. at 60° C. enclosed in a plastic bag | 3 MPa, RT, 30 min.; 264 hrs. at 60° C. enclosed in a plastic bag |

*RT = Room Temperature.

EXAMPLES 7-10

Macro defect free materials were prepared to the formulations described in TABLE 2. Mixing and material processing were as described in Example 1.

Test pieces (80×40×3 mm) were prepared from the cured sheets.

The three-point modulus of rupture values were determined and are also in TABLE 2

In order to test the resistance of products to warping, sheets of examples 7 and 8 were placed with one face in contact with water for two weeks. No warpage was found after this period. Examples 7 and 8 were also submitted to pore size analysis by mercury intrusion porosimetry. The diameter of the maximum pore size in both cases was found to be 0.4 microns.

TABLE 2

| | Example | | | |
|---|---|---|---|---|
| | 7 % | 8 % | 9 % | 10 % |
| BLAST FURNACE SLAG (Cemsave) | 75.8 | 72.5 | 72.5 | 72.5 |
| KLEENODENSE 145K | 24.2 | — | — | — |
| CRYSTAL 112 | — | 27.5 | — | — |
| CRYSTAL 120A | — | — | 27.5 | — |
| CRYSTAL 125 | — | — | — | 27.5 |
| MODULUS OF RUPTURE (Dry [MPa]) | 34.9 | 35.4 | 55.3 | 48.6 |
| MODULUS OF RUPTURE (Wet [MPa]) | 28.1 | 29.9 | 39.2 | 41.6 |
| PRESSING AND CURING DETAILS | 3 MPa, RT, 15 min.; 24 hrs. at 50° C. 144 hrs. at 80° C. enclosed in a | 3 MPa, RT, 15 min.; 24 hrs. at 50° C. 144 hrs. at 80° C. enclosed in a | 1.5 MPa, RT, 30 min.; 120 hrs. at 80° C. enclosed in a plastic bag | 1.5 MPa, RT, 30 min.; 120 hrs. at 80° C. enclosed in a plastic bag |

TABLE 2-continued

| | Example | | | |
|---|---|---|---|---|
| | 7 % | 8 % | 9 % | 10 % |
| | plastic bag | plastic bag | | |

EXAMPLES 11 and 12

The addition to the basic formulation of a fine reactive filler, namely silica fume, was investigated.

The formulations in TABLE 3 were made up in accordance with the mixing and processing instructions described in Example 1.

Test pieces (80×40×3 mm) were prepared from the cured sheets.

The three-point modulus of rupture values were determined and are also give in TABLE 3.

TABLE 3

| | Example | |
|---|---|---|
| | 11 % | 12 % |
| PULVERISED FUEL ASH (Pozzolan) | 67.8 | — |
| BLAST FURNACE SLAG (Cemsave) | — | 74.6 |
| ORDINARY PORTLAND CEMENT | 9.2 | — |
| KLEENODENSE 145K | 16.3 | 17.9 |
| SILICA FUME (Elkem Micro Silica) | 6.8 | 7.5 |
| MODULUS OF RUPTURE (Dry [MPa]) | 22.2 | 40.4 |
| MODULUS OF RUPTURE (Wet [MPa]) | 21.75 | 46.3 |
| PRESSING AND CURING DETAILS | 3 MPa, RT, 15 min.; 24 hrs. at 50° C. 144 hrs. at 80° C. enclosed in a plastic bag | 3 MPa, RT, 15 min.; 24 hrs. at 50° C. 144 hrs. at 80° C. enclosed in a plastic bag |

EXAMPLES 13 and 14

The addition to the basic formulation of a fine inert filler, namely Omya BLR3 Chalk, was investigated.

The formulations in TABLE 4 were made up in accordance with the mixing and processing regimes described in Example 1.

Test pieces (80×40×3 mm) were prepared from the cured sheet.

The three-point modulus of rupture values were determined and are also shown in TABLE 4.

TABLE 4

| | Example | |
|---|---|---|
| | 13 % | 14 % |
| PULVERISED FUEL ASH (Pozzolan) | 63.1 | — |
| BLAST FURNACE SLAG (Cemsave) | — | 69.0 |
| ORDINARY PORTLAND CEMENT | 8.5 | — |
| KLEENODENSE 145K | 22.1 | 24.1 |
| OMYA BLR3 CHALK | 6.3 | 6.9 |
| MODULUS OF RUPTURE (Dry [MPa]) | 11.76 | 29.08 |
| MODULUS OF RUPTURE (Wet [MPa]) | 10.11 | 36.15 |
| PRESSING AND CURING DETAILS | 3 MPa, RT, 15 min.; 24 hrs. at 50° C. 144 hrs. at 80° C. enclosed in a plastic bag | 3 MPa, RT, 15 min.; 24 hrs. at 50° C. 144 hrs. at 80° C. enclosed in a plastic bag |

EXAMPLE 15

The formulation in TABLE 5 was prepared, milled and cured to set the material for ease of handling as described in Example 1.

Once cured the resultant sheet was fired at 1000° C. for 1 hour, after which it was cooled to room temperature.

Test pieces (80×40×3 mm) were prepared from the fired sheet.

The three-point modulus of rupture values were determined and are also given in TABLE 5.

Solids contents of alkali metal silicates

The solids contents of the alkali metal silicates used in the above Examples are given below:

| Silicate | Solids Content |
|---|---|
| KLEENODENSE 145K | 46.8% |
| CRYSTAL 100N | 43.6% |
| CRYSTAL 112 | 45.8% |
| CRYSTAL 120A | 48.2% |
| CRYSTAL 125 | 49.7% |

TABLE 5

| | Example 16 % |
|---|---|
| BLAST FURNACE SLAG (Cemsave) | 72.5 |
| CRYSTAL 100N | 27.5 |
| MODULUS OF RUPTURE (Dry [MPa]) | 44 |
| MODULUS OF RUPTURE (Wet [MPa]) | 39 |
| PRESSING AND CURING DETAILS | 3 MPa, RT, 10 min.; 24 hrs. at 50° C. enclosed in a plastic bag |

We claim:

1. A cementitious product comprising the reaction product of 1%–30% by weight of water; 30%–90% by weight of reactive filler; and 1%–30% by weight of water soluble alkali metal silicate; said reactive filler being a siliceous or aluminosiliceous material capable of reacting with said alkali metal silicate to form a cementitious composition; wherein the total volume of the product comprises not more than 4% of pores having a maximum dimension exceeding 100 microns; the product having a MOR value of at least 15 MPa.

2. A cementitious product according to claim 1, wherein the total volume of the product comprises not more than 2% of pores having a maximum dimension exceeding 100 microns.

3. A cementitious product according to claim 1, wherein the total volume of the product comprises not more than 2% of pores having a maximum dimension exceeding 50 microns.

4. A cementitious product as claimed in claim 1, wherein the total volume of the pores in the product does not exceed 20% of the total volume of the product.

5. A cementitious product as claimed in claim 1, wherein the cementitious composition contains a pozzolanic reactive filler.

6. A cementitious product as claimed in claim 5, wherein the pozzolanic reactive filler is pulverized fuel ash or blast furnace slag.

7. A cementitious product as claimed in claim 1, wherein the water soluble alkali metal silicate is sodium silicate.

8. A cementitious product as claimed in claim 5, wherein the water soluble alkali metal silicate is sodium silicate.

9. A cementitious product as claimed in claim 1, wherein the cementitious composition further comprises from 0 to 20% by weight of hydraulic cement, and from 0 to 5% by weight of glycerol.

10. A cementitious product as claimed in claim 8, wherein the cementitious composition further comprises from 0 to 20% by weight of hydraulic cement, and from 0 to 5% by weight of glycerol.

11. A cementitious product as claimed in claim 1 in the form of a roof tile or roofing slate.

12. A cementitious product as claimed in claim 8 in the form of a roof tile or roofing slate.

13. A cementitious product as claimed in claim 9 in the form of a roof tile or roofing slate.

14. A cementitious product as claimed in claim 10 in the form of a roof tile or roofing slate.

15. A cementitious product as claimed in claim 1, wherein the alkali metal silicate has a viscosity of at least 500 centipoise.

16. A cementitious product as claimed in claim 1, wherein the reactive filler comprises calcium and silica fume.

17. A process for the preparation of a cementitious product, wherein a cementitious composition comprising
   (i) from 1 to 30% by weight of water;
   (ii) from 30 to 90% by weight of at least one reactive filler, which is capable of reacting chemically with an alkali metal silicate to form a cementitious composition; and
   (iii) from 1 to 30% by dry weight of at least one water soluble alkali metal silicate;
is milled by means of high shear mixing, shaped, and then hardened by curing or firing, so that the total volume of the product is comprised of not more than 4% of pores having a maximum dimension exceeding 100 microns.

18. A process as claimed in claim 17 wherein the cementitious composition is subjected to high shear mixing by calendering in a twin roll mill.

* * * * *